March 8, 1955     L. P. GOETZ     2,703,491

STRAIN MEASURING INSTRUMENT

Filed Oct. 21, 1949

INVENTOR.
L. P. GOETZ
BY Hudson & Young
ATTORNEYS

United States Patent Office 2,703,491
Patented Mar. 8, 1955

2,703,491

STRAIN MEASURING INSTRUMENT

Louis P. Goetz, Bartlesville, Okla., assignor to Phillips Petroleum Company, a corporation of Delaware Application October 21, 1949, Serial No. 122,825

6 Claims. (Cl. 73—88.5)

This invention relates to an impedance measuring circuit particularly adapted for use with strain gauges. In another aspect, it relates to such a circuit in which the reactance and resistance of the leads connecting the impedance to be measured to a measuring circuit are effectively compensated for.

Strain gauges have many useful applications in well drilling and pumping equipment. For example, a strain gauge may be utilized to measure the deformation of a diaphragm which is suspended in a well bore for the purpose of measuring the pressure in the well. Strain gauges are also useful in measuring the deformation of the well casing or tubing and in determining the strain in a sucker rod. In these and many related applications, an electrical conductor is bonded to the surface which is subject to strain, the resistance of the conductor varying in accordance with changes in its length produced by strain in the member to which the conductor is bonded. Such changes in the electrical resistances of the strain gange produce an accurate indication of the stresses to which the member is subjected. The resistance variations produced in this manner are extremely small and are affected by the temperature of the member to which the strain gauge is secured. This temperature effect has, in the past, been compensated for by utilizing a Wheatstone bridge circuit, one arm of which includes a strain gauge attached to the member to be tested and another arm of which includes a similar gauge which, however, is not subjected to strain although it is maintained at the same temperature as the first gauge. When so connected, the effect of temperature variations is substantially or completely eliminated.

Where the strain gauge is located remotely from the indicating or recording apparatus, as is the case when strains are to be measured in a well, it is extremely difficult to measure the resistance variations of the gauge when utilizing a direct current circuit since, as stated, the resistance variations are minute as compared to the total resistance of the other portions of the circuit. The use of an alternating current bridge circuit enables a substantially greater sensitivity to be obtained, but the reactance of the conductors connecting the strain gauges to the measuring apparatus is considerable and interferes with proper measurement of the strains. In addition, stray voltages may be set up due to leakage paths existing in some part of the system, particularly where it is desired to measure strains in pipe lines in wet or damp locations. These stray voltages may result, for example, from leakage to ground from parts of the measuring circuit, it being understood that one side of the power line supplying current to the measuring apparatus is commonly grounded in conventional power transmission systems.

In accordance with this invention, the effects due to the reactance of the conductors connecting the strain gauges to the measuring apparatus as well as the effects due to stray voltages are effectively eliminated by applying a neutralization voltage across the indicating terminals of the bridge, this neutralizing voltage being of the proper phase and amplitude as to eliminate the deleterious effects of conductor reactance and stray voltages. The production of a neutralizing voltage in this manner is to be distinguished from the ordinary bridge balancing circuits in that the correction is made, not by varying the inductance or capacitance of the bridge components themselves, but by independently producing a neutralizing voltage of the proper phase and amplitude. This enables the entire bridge circuit to be mounted at a location remote from the indicating or recording apparatus and also is advantageous in that the neutralizing voltage is generated independently of the bridge itself.

It is an object of the invention to provide an impedance measuring bridge circuit of novel character.

It is a further object to provide such a circuit which is particularly adapted for the measurement of strains at locations remote from the indicating or recording apparatus associated with the strain measuring apparatus.

It is a still further object to provide a circuit of wide application, which is simple and reliable in operation, and utilizes a minimum number of standard circuit components.

Various other objects, advantages and features of the invention will become apparent from the following detailed description taken in conjunction with the accompanying drawings, in which.

Figure 1:
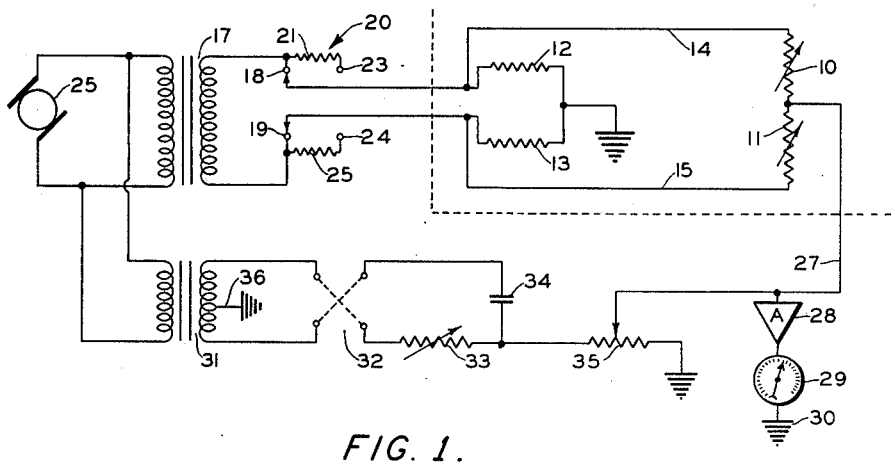
Figure 1 is a schematic circuit diagram of my novel impedance measuring circuit.

Referring now to the drawings in detail and particularly to Figure 1, an impedance 10, which may be a strain gauge, is connected in a Wheatstone bridge circuit with a balancing impedance 11, which may be a similar strain gauge, and a pair of balancing resistors 12, 13. The strain gauges may be of the type shown by Simmons Patent 2,292,549 (1942) and, when bonded to a member to be tested, the strain gauge resistance is proportional to the strain of the test member. In the application of my circuit to the measurement of strains in wells, the entire bridge circuit may be mounted downhole or, alternatively, the strain gauges are mounted downhole and the balancing resistors are mounted uphole with the indicating or recording apparatus.

In either case, an alternating voltage is applied between a conductor 14 connecting impedance 10 to resistance 12 and a conductor 15 connecting impedance 11 and resistance 13 from the secondary winding of a transformer 17. It will be noted that the secondary voltage may be applied directly to the bridge circuit through terminals 18, 19 of a switch 20 or, alternatively, a voltage of reduced amplitude may be applied to the bridge through resistances 21, 25 and terminals 23, 24 of the switch 20. The primary winding of transformer 17 is supplied with electrical energy from any suitable source, such as a generator 25.

It will be noted that the junction between resistors 12, 13 is grounded and that the junction between impedances 10, 11 is connected by a conductor 27 to an amplifier 28, the output of which is fed through a meter 29 to a ground connection 30. It will be understood, of course, that the meter may be replaced by a suitable recording device if it is desired to make a continuous record of the strains incident upon the gauges. The amplifier and meter, of course, are located uphole when the circuit is utilized for measuring strains in a well. It will be recognized that the circuit thus far described is an ordinary alternating current bridge and, when impedance 10 is changed responsive to strain, an unbalance voltage is produced which is read upon meter 29 and is proportional to the strain. Where impedance 11 is a strain gauge of similar construction which is not, however, subjected to strain, the effect of temperature variations is balanced out by the bridge circuit. However the reactance of the conductors connecting the uphole and downhole equipment as well as stray voltages appearing at the conductors produce erroneous readings when the instrument is used for measuring strains in a well. If the entire bridge circuit is mounted downhole, the reactance of conductor 27 and the conductors connecting switch 20 with resistances 12, 13 produce the erroneous readings whereas, if only the strain gauges are mounted downhole, the reactance of conductors 14, 15, and 27 produces an erroneous reading.

In accordance with the invention, a neutralizing voltage is applied across the indicating terminals of the bridge, that is between conductor 27 and ground, of the proper phase and amplitude to balance out the reactance and stray voltage effects. To this end, generator 25 is connected to the primary winding of a transformer 31 having a center-tapped secondary winding, the end portions of which are connected through a reversing switch 32 to a phase shifting network consisting of a variable resistance 33 and a condenser 34 connected in series across the terminals of reversing switch 32. The junction between resistance 33 and condenser 34 is connected to ground through a potentiometer 35, the contactor of which is connected to conductor 27.

It will be noted that the center tap of the secondary winding of transformer 31 is grounded at 36 and, accordingly, a voltage is impressed upon phase shifting network 33, 34 which is alternately positive and negative with respect to ground, that is, with respect to the junction between resistances 12 and 13. The network 33, 34 produces a phase shift of from zero to 180° in the voltage impressed thereon, and, by the use of reversing switch 32, the phase may be shifted between zero and 360°. Accordingly, at the output of the network 33 and 34, an alternating voltage appears which is alternately positive and negative with respect to ground and which may have any desired phase relationship with the voltage impressed upon the bridge circuit. The amplitude of this voltage is controlled by the setting of potentiometer 35.

In operation of the circuit, a predetermined strain is impressed upon the gauge with the result that impedance 10 has a predetermined desired value. Variable resistance 33 in the phase shift network and potentiometer 35 are adjusted until a zero reading is obtained upon the meter 29. When this condition occurs, the reactance of the conductors is compensated for as well as any effects due to stray voltages appearing at the conductors. The circuit is then in condition to record or indicate changes in the variable impedance 10 and, in a preferred embodiment of the invention, these impedance variations are proportional to stresses imposed upon a strain gauge, the effects of temperature variations upon the gauge being compensated for by the similar unstressed gauge represented by impedance 11. It is a feature of the invention that the balancing voltage is produced independently of the bridge circuit itself and is applied directly to the indicating terminals of the bridge. This enables a very accurate compensation to be made, even though the strain gauges are located remotely from the rest of the circuit.

Figure 2:
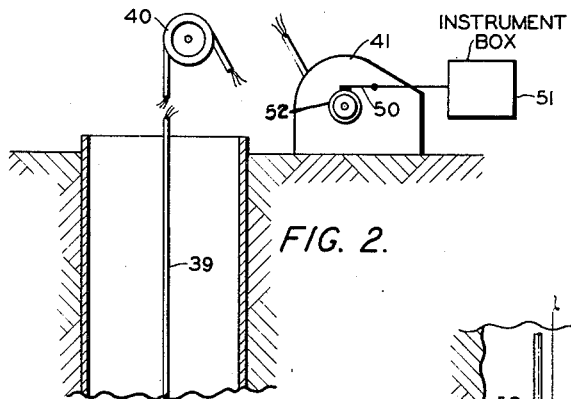
Figure 2 shows the application of my circuit to the measurement of pressure in a well.

In Figure 2, I have illustrated the use of my novel circuit in the measurement of well pressure. In this figure, a pressure measuring device 38 is suspended in the well by a cable 39 which passes over a pulley 40 to a windlass 41. The device 38 includes a casing 42 separated by a partition 43 into an oil-filled chamber 44 and a pressure chamber 45. The lower end of the casing has an opening 46 formed therein which is closed by a diaphragm 47. Mounted on the diaphragm is a strain gauge 48, corresponding to the impedance 10, Figure 1, the resistance of which is proportional to strain of the diaphragm, this strain, in turn, being proportional to the well pressure. A second strain gauge 49, corresponding to impedance 11, Figure 1, is mounted at any unstressed part of the device and is subjected to the same temperature as strain gauge 48. The strain gauges are connected through conductors which form an integral part of cable 39 to slip rings, one of which is shown at 52, these slip rings being connected, in turn, through brushes such as 50 to an instrument box 51. The instrument box 51 contains the phase shifting network, the potentiometer 35, and other parts of the circuit of Figure 1. As shown, only the strain gauges are mounted in the casing 42. However, if desired, the entire bridge circuit may be mounted within the casing and connected by conductors to the balancing and measuring circuits at the surface.

Where the strain gauges but not the balancing resistances are mounted in the casing, only three conductors are necessary to connect them with the surface apparatus whereas, if the entire bridge circuit is mounted in the casing, an additional conductor is required to provide the ground connection to the junction between resistances 12, 13. The novel measuring circuit of my invention provides an accurate measurement of the strain produced in diaphragm 47 and, hence, of the well pressure, the reading of the instrument being substantially unaffected by the reactance of the conductors connected to the surface and downhole equipment or by strain voltages appearing on the conductors.

Figure 3:
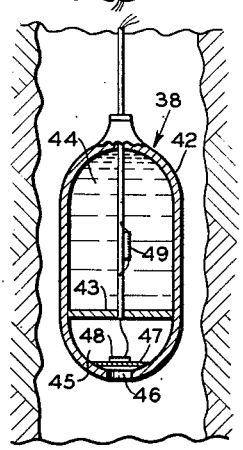
Figure 3 shows the application of my circuit to the measurement of strains in a sucker rod string.

In the modification of Figure 3, my novel measuring circuit is applied to a sucker rod string composed of rod sections 53, 54 connected by a joint assembly 55. Sucker rod 54 has a strain gauge 56 bonded thereto while a second strain gauge 57 is bonded to an insulating member 58 mounted on sucker rod 54 but not subject to the strains therein. These strain gauges are connected in the manner described in connection with Figure 2, it being understood that strain gauge 56 corresponds to impedance 10 and strain gauge 57 corresponds to impedance 11. The use of this apparatus with the novel circuit of my invention permits the strain in a sucker rod string to be accurately determined.

Figure 4:
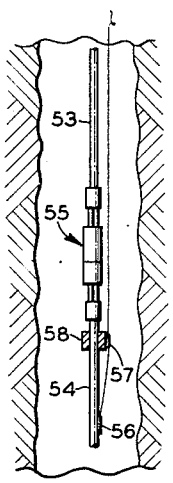
Figure 4 discloses the application of my circuit to the measurement of strains in a well casing.
Figure 4:
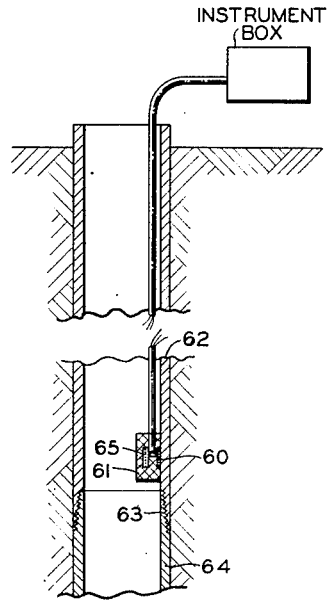

In the modification of the invention shown by Figure 4, a strain gauge 60 is mounted in a support 61 and bonded to a casing section 62, the support 61 being mounted for purposes of accessibility closely adjacent a joint 63 between casing section 62 and a second casing section 64. Also mounted in the support 61 is a strain gauge 65 which, however, is not subjected to strains in the casing section 62. It will be apparent that the strain gauge 65 compensates for temperature variations and corresponds to impedance 11 of Figure 1 whereas strain gauge 60 is the active strain-measuring element and corresponds to the impedance 10 of Figure 1. The gauges are connected with the surface equipment in the manner described in connection with Figures 2 and 3, and the use of my novel neutralization circuit provides an accurate indication of strains in the casing which is not affected by the reactance of the conductors connecting the strain gauges with the surface equipment nor by stray voltages appearing at the conductors.

While the invention has been described in connection with a present, preferred embodiment thereof, it is to be understood that this description is illustrative only and is not intended to limit the invention, the scope of which is defined by the appended claims.

I claim:

1. An electrical strain-measuring circuit which comprises, in combination, a pair of interconnected strain gauges, three conductors extending from a first location to said strain gauges, said conductors being connected to the junction between said gauges and to the free ends of said gauges, respectively, and apparatus at said first location including a pair of interconnected balancing resistors connected between the last two of said conductors, means for applying an alternating voltage between said two conductors, an indicator and a balancing circuit both connected between the first conductor and the junction between said balancing resistors, said balancing circuit including a center tapped source of alternating voltage, a reversing switch connected to said source, a phase shift network including a condenser and a variable resistance connected in series across the output terminals of said switch, a potentiometer having one terminal connected both to the junction between said balancing resistors and to the center tap of said second mentioned alternating voltage source and its other terminal connected to the junction between said variable resistance and said condenser, and a lead connecting the contactor of said potentiometer to said third conductor.

2. A strain-measuring instrument which comprises, in combination, a pair of electrical strain-responsive gauges and a pair of balancing resistors connected in a Wheatstone bridge network, four conductors extending from the respective terminals of said bridge to a first location, and apparatus at said first location including means for supplying an alternating voltage through two of said conductors to two opposite terminals of said bridge, an indicator and a balancing circuit connected through said other two conductors to the other opposite terminals of said bridge, said balancing circuit including a center tapped source of alternating voltage, a reversing switch connected to said source, a phase shift network including a condenser and a variable resistance connected in series across the output terminals of said switch, a potentiometer having one terminal connected both to the junction between said balancing resistors and to the center tap of said second mentioned alternating voltage source and its other terminal connected to the junction between said variable resistance and said condenser, and a lead connecting the contactor of said potentiometer to one of said other opposite terminals.

3. A strain gauge comprising, in combination, a Wheatstone bridge network including a pair of electrical strain responsive impedance elements and a pair of balancing impedances, said strain responsive impedance elements being disposed in adjacent arms of said network and in close proximity to one another whereby said strain responsive elements are at the same temperature, one of said elements being subjected to strain by a test member, means for applying an alternating voltage across a pair of opposite terminals of said bridge, means for measuring the potential developed across the other opposite terminals of said bridge, a phase shift network including a resistor and a capacitor connected in series relation, an alternating voltage connected in series with said resistor and capacitor, and a potentiometer, one end terminal of said potentiometer being connected to the junction between said resistor and said capacitor, the second end terminal and the contactor of said potentiometer being connected to respective second-mentioned opposite terminals of said bridge, said second end terminal of said potentiometer being connected to a reference point on said alternating voltage source.

4. The combination in accordance with claim 3 further comprising a casing, a cable to lower said casing into a well, and a diaphragm forming a part of said casing whereby said diaphragm is deformed by an amount proportional to the well pressure, said one strain responsive elements being secured to said diaphragm whereby deformation of said diaphragm changes the impedance of said one element.

5. The combination in accordance with claim 3 further comprising a sucker rod, said one strain responsive element being secured to said sucker rod whereby the impedance of said one element is a function of the strain in said sucker rod.

6. The combination in accordance with claim 3 further comprising a well casing, said one strain responsive element being secured to said casing whereby the impedance of said one element is a function of the strain in said casing.

References Cited in the file of this patent

UNITED STATES PATENTS

| | | |
|---|---|---|
| 2,008,857 | Flanders | July 23, 1935 |
| 2,094,207 | Eaton | Sept. 28, 1937 |
| 2,276,843 | Hathaway | Mar. 17, 1942 |
| 2,346,838 | Haight | Apr. 18, 1944 |
| 2,360,886 | Osterberg | Oct. 24, 1944 |
| 2,392,293 | Ruge | Jan. 1, 1946 |
| 2,466,034 | Mathews | Apr. 5, 1949 |
| 2,483,300 | Howe | Sept. 27, 1949 |
| 2,509,621 | Willoughby | May 30, 1950 |